Sept. 6, 1960
J. C. MASON
2,951,281
VALVE SERVICING APPARATUS
Filed Oct. 21, 1957
3 Sheets-Sheet 1
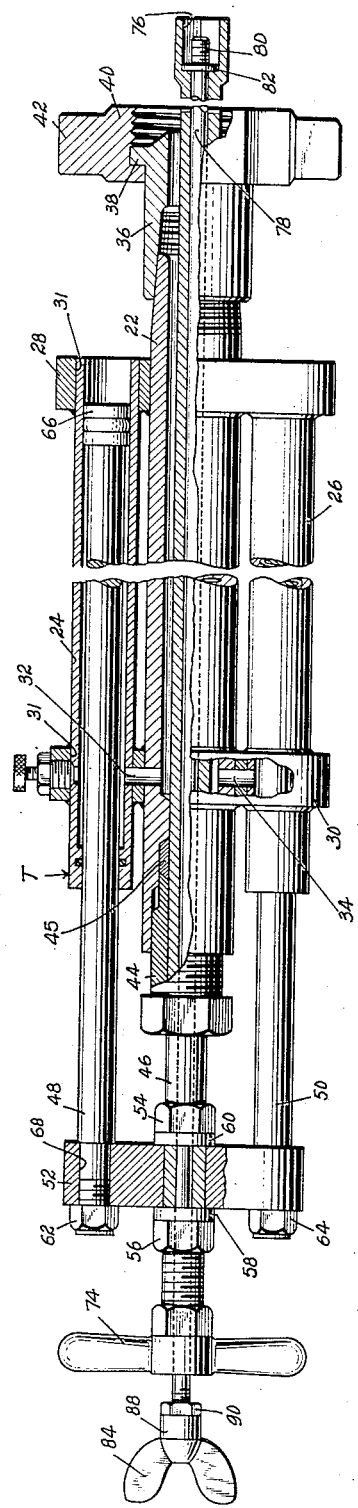
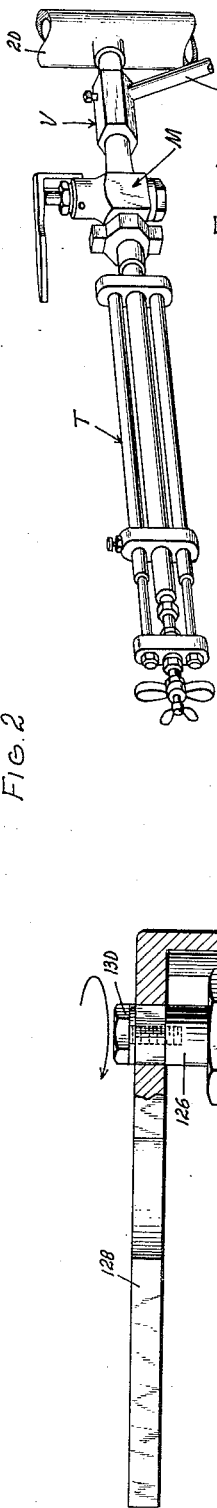
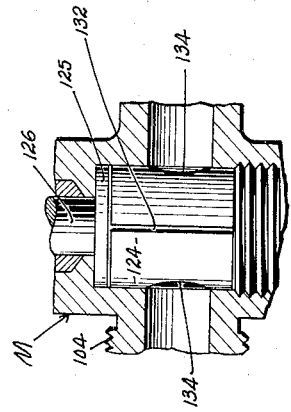
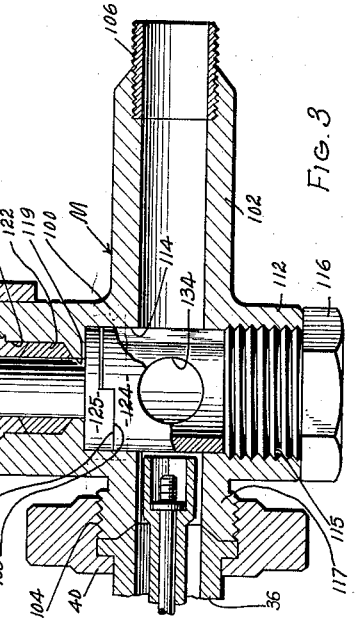
JOHN C. MASON deceased,
BY Mrs. John C. Mason, administratrix
INVENTOR.
BY Francis A. Utecht, Jr.
ATTORNEY.

Sept. 6, 1960 J. C. MASON 2,951,281
VALVE SERVICING APPARATUS
Filed Oct. 21, 1957 3 Sheets-Sheet 2

JOHN C. MASON deceased,
BY Mrs. John C. Mason, administratrix
INVENTOR.

BY Francis A. Utecht, Jr.
ATTORNEY

Sept. 6, 1960     J. C. MASON     2,951,281
VALVE SERVICING APPARATUS
Filed Oct. 21, 1957     3 Sheets-Sheet 3

JOHN C. MASON deceased,
BY Mrs. John C. Mason, administratrix
INVENTOR.

BY Francis A. Utecht, Jr.
ATTORNEY.

United States Patent Office 2,951,281
Patented Sept. 6, 1960

2,951,281

VALVE SERVICING APPARATUS

John C. Mason, deceased, late of Bellflower, Calif., by Mrs. John C. Mason, Box 726, Bellflower, Calif., administratrix Filed Oct. 21, 1957, Ser. No. 691,222

8 Claims. (Cl. 29—213)

The present invention relates generally to valves and more particularly to novel and improved valve servicing apparatus.

Under certain conditions it is desirable to be able to service a valve while the upstream side thereof is under fluid pressure. Such servicing is necessitated since after a valve has undergone use for a period of time it tends to become plugged. This is especially true where the valve is employed under coking or wax conditions. When the valve becomes plugged it is necessary to remove the valve stem, re-seat and clean the valve and then replace the stem.

It is a major object of the present invention to provide valve servicing apparatus which may be employed to remove the valve stem of a valve while the latter remains under pressure.

A further object is to provide apparatus of the aforedescribed nature which employs the pressure on the upstream side of the valve being serviced in such a manner as to render the valve stem removing operation simple and foolproof.

An additional object is to provide apparatus of the aforedescribed nature which permits the valve stem to be removed and replaced with considerably less labor and in a shorter period of time than heretofore proposed devices of this nature.

A further object is to provide valve servicing apparatus which permits the valve packing to be replaced and the valve seat to be reseated while the valve remains under pressure.

Another object of the invention is to provide apparatus of the aforedescribed nature which is simple in design and rugged of construction whereby it may afford a long and trouble-free service life.

These and other objects and advantages of the present invention will become apparent from the following detailed description when taken in conjunction with the appended drawings wherein:

Figure 1 is a perspective view showing how valve servicing apparatus embodying the present invention is employed to service a valve;

Figure 2 is a side elevational view taken partly in central vertical section showing a preferred form of valve servicing apparatus embodying the present invention;

Figure 3 is a central vertical sectional view showing a unique valve stem-receiving valve member embodying the present invention;

Figure 4 is a fragmentary view showing certain parts of the valve member of Figure 3 disposed in a second position;

Figure 6:
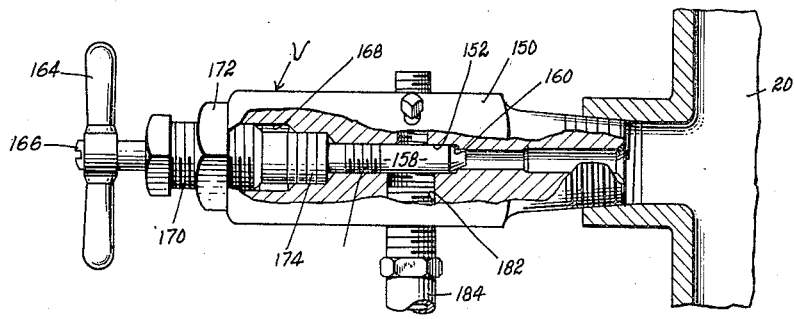
Figures 6 through 11 are side views showing how said valve servicing apparatus is utilized in a valve servicing operation.

Referring to the drawings and particularly Figure 1 thereof, there is shown a preferred form of valve servicing apparatus embodying the present invention arranged in position to service a valve V. The valve V is connected to a pipe 20 which may be assumed as containing pressurized fluid. The valve V may be of the type shown in application Serial No. 670,349 filed by John C. Mason, July 5, 1957, now Patent No. 2,936,000. The valve servicing apparatus may however be employed with other similar valves having a removable valve stem. The preferred form of valve servicing apparatus includes a pressure tool T and a valve stem-receiving valve member M interposed between the front of the pressure tool T and the rear of the valve V.

Referring now to Figure 2 for the details of the preferred form of pressure tool T, this tool includes a center tube 22 disposed between a pair of balance tubes 24 and 26. The three tubes 22, 24 and 26 are rigidly interconnected by means of a front spacer 28 and a rear spacer 30, these spacers being formed with aligned bores 31 which telescopically receive the tubes. It should be noted that the rear portion of the upper and lower balance tubes 24 and 26 are in communication with the interior of the center tube 22 by means of passages 32 and 34 formed through the tubes and the rear spacer 30.

The front end of the center tube 22 is threadably affixed to a union extension 36. The union extension 36 is generally tubular in configuration and its inner diameter is in alignment with the inner diameter of the center tube. The front portion of the union extension 36 is formed with a radially extending lip 38. A coupling nut 40 is rotatably carried by the front portion of the union extension 36 and the lip 38 acts as a stop limiting forward movement of the coupling nut 40 relative to the union extension. The coupling nut 40 is formed with a pair of diametrically opposed manipulating ears 42. The rear end of the center tube 22 threadably receives a packing nut 44 which is utilized in conjunction with conventional packing 45.

An operating tube 46 extends through the center tube 22 and its packing nut 44 and packing 45 for axial movement relative thereto. A pair of balance rods 48 and 50 are received by the upper and lower balance tubes 24 and 26, respectively, for axial reciprocation relative thereto. The rear end of the three tubes 46, 48 and 50 are rigidly interconnected by means of a yoke 52. In this regard, the rear portion of the operating tube 46 is externally threaded so as to receive a pair of nuts 54 and 56. The midportion of the yoke 52 is interposed between sealing rings 58 and 60 by means of the aforedescribed nuts 54 and 56. The rear portion of the balance rods 48 and 50 are of reduced diameter and are externally threaded so as to receive nuts 62 and 64, respectively. The yoke 52 is formed with bores 68 for receiving the reduced rear portions of the balance tubes 48 and 50, as is clearly indicated in Figure 2. The front ends of the balance rods 48 and 50 are formed with pistons 66 which have a sealing engagement with the interiors of the balance tubes 24 and 26. A generally T-shaped handle 74 is rigidly affixed to the rear of the operating tube 22. The front end of the operating tube 46 is of enlarged diameter and is formed with a square cavity 76.

Slidably disposed within the operating tube 46 for axial movement relative thereto is a mandrel 78. The front end of this mandrel 78 is formed with external threads 80. At the rear of this threaded portion the front end of the mandrel is formed with a disc 82. The outer diameter of this disc 82 is somewhat smaller than the diameter of the cavity 76. The rear end of the mandrel 78 is rigidly affixed to a wing-type handle 84, the mandrel's rear end being externally threaded so as to receive the internally threaded body 88 of this handle 84. A lock nut 90 is disposed forwardly of the nut body 88.

Figure 5:
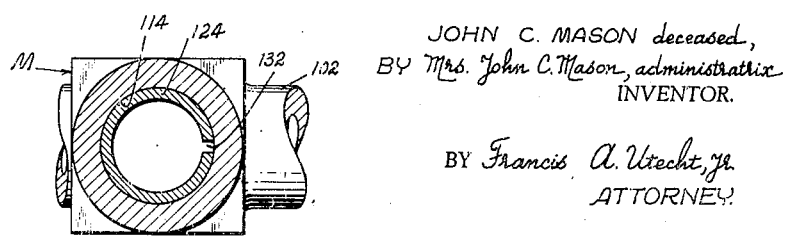
Figure 5 is a horizontal sectional view taken on a line through the upstanding leg and tubular core illustrated in Figure 3.
Figure 9:
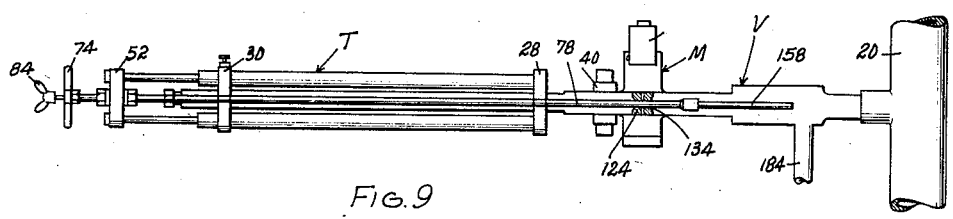

Referring now to Figures 3, 4 and 5 there are disclosed the details of the valve stem-receiving valve member M. This member M includes a generally T-shaped body 100 having a tubular center leg 102 which is coaxial with the center tube 22 of the tool T. The rear portion of the center leg 102 is formed with external threads 104 adapted to be received by the coupling nut 40 so as to rigidly affix the rear end of the member M to the front end of the tool T. The front end of the center leg 102 is threadably affixed to an externally threaded nipple 106. The front portion of this nipple 106 is adapted to be removably threadably received by the internally threaded bore 168 of the valve V in a manner to be fully described hereinafter. The rear portion of the center leg 102 is integrally connected to an upstanding leg 110. Spaced therebelow is an integral depending leg 112. At the junction of the three legs 102, 110 and 112 the body 100 is formed with a vertically extending cylindrical valve cavity 114. The lower end of this valve cavity 114 merges into an internally threaded bore 115 of slightly larger diameter that extends through the lower leg 112 and receives a plug 116. The rear end of the center leg 102 is formed with a rear coupling nipple 117 that is externally threaded so as to receive the coupling nut 40 of the union extension 36. The upper leg 110 is coaxially formed with a packing bore 118 which is connected to the upper end of the valve cavity 114 by a bore 119 of reduced diameter. The upper end of the packing bore 118 is internally threaded so as to receive a packing nut 120. Conventional packing 122 is disposed within the packing bore 118 below the packing nut 120.

Rotatably arranged within the valve cavity 114 is a generally tubular core 124. A disc-like dog 125 is disposed in this cavity above the core 124. The center of the dog 125 is integrally connected with an upstanding post 126 that extends through the packing cavity 118 and is sealed with respect thereto by means of the packing 122. The upper end of the post 126 is rigidly affixed to an operating handle 128 by means of a bolt 130.

The core 124 is open at its upper and lower ends and as particularly shown in Figure 5 is noncontinuous, its ends being separated by a vertically extending slit 132. The side walls of the bore 124 are formed with a pair of aligned ports 134. The upper portion of the core 124 is cut away along substantially 180 degrees of its periphery so as to define a recess 136. This recess 136 receives a complementary projection 138 formed over substantially 180 degrees of the dog 125. This arrangement permits rotation of the post 126 to be concurrently imparted to the core 124 in order that the latter may be moved between its positions of Figures 3 and 4.

Figure 7:
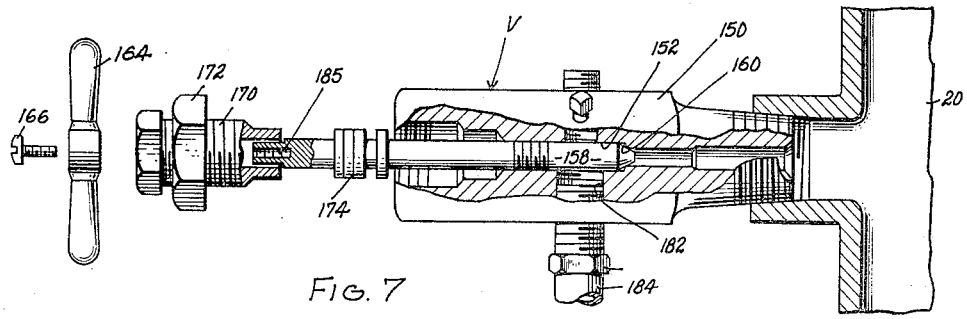

Referring now to Figure 6, the valve V includes a generally tubular body 150 centrally formed with a fluid passage 152 the front end of which is in communication with the interior of the pipe 20. The intermediate portion of the fluid passage 152 is internally threaded and receives an elongated valve stem 158. The front portion of the fluid passage 152 is formed with a seat 160 that receives the front end of the valve stem 158. The front end of this valve stem 158 is of generally frusto-conical configuration so as to be complementary to the valve seat 160. The valve stem 158 extends to the rear of the valve body 150 and is removably affixed to a handle 164 by means of a bolt 166. The rear portion of the fluid passage 152 merges into a coaxial internally threaded cavity 168. This cavity receives the front portion of an externally threaded packing gland 170. The packing gland 170 is externally threaded so as to receive a lock nut 172. The intermediate portion of the fluid passage 152 is provided with removable packing 174 and forwardly of such packing the valve stem 158 is formed with threads 180 engaged with complementary internal threads formed in the intermediate portion of the fluid passage 152. Downstream or rearwardly from the valve seat 160 the valve body 150 is formed with a radially extending outlet port 182. This outlet port 182 receives a length of conduit 184. As shown in Figure 7, the handle bolt 166 is received by an internally threaded blind bore 185 formed at the rear of the valve stem 158.

In servicing a valve with the aforedescribed apparatus, the coupling nut 40 of the pressure tool T is threaded to the rear nipple 117 of the valve stem-receiving valve member M. At this time the core 124 of the member M should be disposed in its position of Figure 3, i.e. the ports 134 will be in sealing engagement with the sides of the valve cavity 114 and the slit 132 will be facing the front end of the member M. Referring now to Figures 6 and 7, the valve stem 158 of the valve V will be moved to its closed position of Figure 6 whereby the front end of the valve stem will be in sealing engagement with the valve seat 160. Thereafter, as shown in Figure 7, the handle 164, packing gland 170, lock nut 172, valve stem 158, and packing 174 will be withdrawn rearwardly from the valve V. At this time the engagement of the front end of the valve stem 158 with the valve seat 160 will serve to seal the portion of the fluid passage rearwardly of the valve seat 160 with respect to the pressure within the pipe 20. It is possible, however, that some slight leakage will take place past the valve seat 160. The extent of such leakage has been found to be inconsequential.

Figure 8:
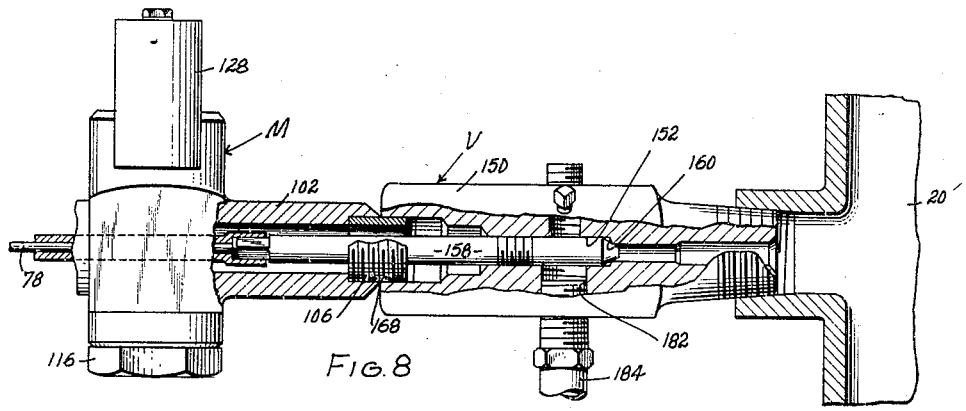
Figure 10:
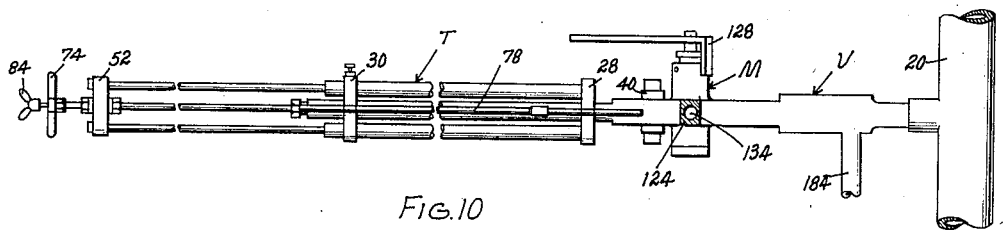

Next, as indicated in Figure 8, the nipple 106 of the member M is threaded into the internally threaded cavity 168 of the valve body 150. Thereafter, the core 124 of the member M will be rotated to its open position of Figures 4, 5 and 8. In this position, the ports 134 are aligned with the longitudinal axis of the member's center leg 102 and the interior of the valve's fluid passage 152 will be in communication with the interior of the member M and the center leg 22 of the pressure tool P. The operating tube 46 and mandrel 78 of the pressure tool P are then advanced through the ports 134 until the rear end of the valve stem 158 is encompassed by the cavity 76. The mandrel 78 is then rotated so as to cause the external threads 80 formed at the front end of the mandrel 78 to engage the internal threads formed within the blind bore 185 of the valve stem's rear end. The operating tube 46 may then be retracted through the union extension 36, as indicated in Figure 10. The core 124 of the member M may then be rotated to a closed position and the coupler nut 40 of the union extension disengaged from the rear coupling nipple 117 of member M, as shown in Figure 11.

It should be particularly noted that the rearwardly-facing areas of the balance pistons 66 should approximate the forwardly-facing areas of the operating tube 46 and its attached parts in order that the forwardly-acting forces resulting from the exposure of the pistons 66 to the fluid pressures within the pipe 20 will be substantially balanced with respect to the rearwardly-acting forces resulting from the exposure of the operating tube 46 to such pressures. With this arrangement, very little manual effort is required to effect longitudinal movement of the operating tube 46 relative to the fixed portions of the pressure tool T.

Figure 11:
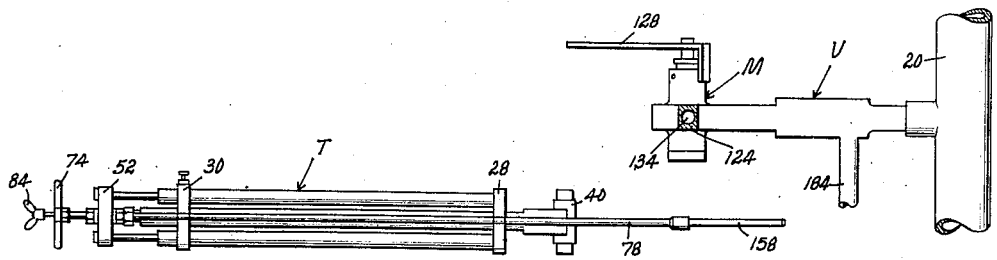
Figure 12:
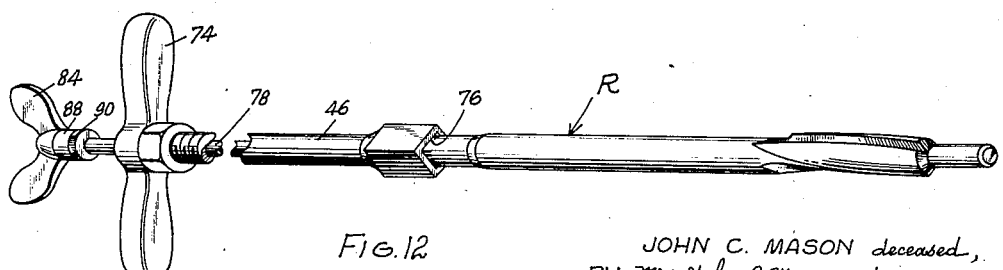
Figure 12 is a perspective view showing how a reamer may be employed with said valve servicing apparatus.

It should also be noted that during the time the valve stem 158 is withdrawn through the core 124 and the latter is in its open position indicated in Figures 10 and 11, the slot 132 of the core 124 will admit the fluid pressure from the conduit 20 to the interior of the core. The existence of this pressure within the core 124 will serve to urge the sidewalls of the core radially outward into tight sealing engagement with the valve cavity 114. The valve stem 158 may be serviced or else replaced after it has been withdrawn to its position of Figure 11. Referring to Figure 12, a reamer R may be threaded upon the front end of the mandrel 78 before the valve stem is replaced. With the coupling nut 40 of the union extension 36 still engaged with the rear nipple 117 of the member M, the core 124 may be rotated to its open position and the reamer R advanced into the confines of the valve V so as to engage the valve seat 160. Rotation of the operating tube 46 will thereafter cause the reamer R to reseat the seat 160. The reamer R will then be withdrawn in the same manner as described hereinbefore in connection wtih the withdrawal of the valve stem 158. The valve stem 158 or a replacement therefor may next be advanced into the fluid passage 152 and engaged with the threads 180 thereof. It will be apparent that the packing 174 may likewise be replaced if necessary.

It should be particularly noted that at such time as the core 124 of the member M is again opened the rotational force applied by the force-applying side of the dog 125 against the complementary side of the depression 138 of the core will tend to spring the force-receiving sidewall of the core radially inwardly relative to the sides of the valve cavity 114. This action will make it easier to rotate the core to an open position. It should likewise be noted that during the time the core 124 rotates between its open and closed position, the radially outer sides of the slit 132 will scrape along the sides of the valve cavity 114 so as to maintain the sides of this cavity free of foreign matter tending to effect sticking of the core.

Various modifications and changes may be made with respect to the foregoing description without departing from the spirit of the invention or the scope of the following claims.

What is claimed is:

1. Apparatus for servicing a valve having a body formed with a fluid passage, the rear end of said passage being open, a valve stem extending through the rear end of said passage and sealing means removably disposed in the rear end of said passage, comprising: a valve stem-receiving member having means on its front portion for detachably affixing it to the rear end of said valve body, said member being formed with a conduit that is aligned with said fluid passage when said member is affixed to said valve body, said member also having a core formed with bore means normally arranged transversely to said conduit so as to block same, said core means being rotatable to a second position wherein said bore means are aligned with said conduit; a pressure tool having a center tube and balance tube means aligned with said center tube, the interiors of said center tube and said balance tube means being connected; mounting means on the front portion of said center tube engageable with the rear end of said valve stem-receiving member; an operating tube axially slidably disposed within said center tube formed at its front end with means that receive the rear end of said valve stem and restrain said stem against rotation and said operating tube being formed at its rear end with handle means; a mandrel axially slidably and rotatably disposed within said operating tube, the front end of said mandrel being formed with means removably securable to the rear end of said valve stem; balance rod means axially slidably arranged within said balance tube means and provided with piston means, the rearwardly-facing areas of said piston means approximating the forwardly-facing areas of said operating tube; and means rigidly interconnecting said operating tube and said balance rod means for concurrent axial movement.

2. Apparatus as set forth in claim 1 wherein said balance tube means include a pair of tubes disposed on opposite sides of said center tube and said balance rod means include a pair of rods axially slidably disposed within said balance tubes with said balance rods being rigidly interconnected to said operating rod by means of a yoke and with said piston means consisting of a pair of pistons, each being secured to one of said balance rods.

3. Apparatus as set forth in claim 1 wherein the core of said valve stem receiving member is of hollow cylindrical configuration with one of its sides being formed with a slit that faces said valve body when said bore means are arranged transversely to said conduit.

4. Apparatus for servicing a valve having a body formed with a fluid passage, the rear end of said passage being open, a valve stem extending through the rear end of said passage and sealing means removably disposed in the rear end of said passage, comprising: a valve stem-receiving member having means on its front portion for affixing it to the rear end of said valve body, said member being formed with a conduit that is aligned with said fluid passage when said member is affixed to said valve body, said member also having a core formed with bore means normally arranged transversely to said conduit so as to block same, said core means being rotatable to a second position wherein said bore means are aligned with said conduit, said core being of hollow cylindrical configuration with one of its sides being formed with a slit that faces said valve body when said bore means are arranged transversely to said conduit; a pressure tool having a center tube and balance tube means aligned with said center tube, the interiors of said center tube and said balance tube means being connected; mounting means on the front portion of said center tube engageable with the rear end of said valve stem-receiving member; an operating tube axially slidably disposed within said center tube and formed at its front end with means removably engageable with the rear end of said valve stem; balance rod means axially slidably arranged within said balance tube means and provided with piston means, the rearwardly-facing areas of said piston means approximating the forwardly-facing area of said operating tube; and means rigidly interconnecting said operating tube and said balance rod means for concurrent axial movement.

5. Apparatus as set forth in claim 4 wherein said balance tube means include a pair of tubes disposed on opposite sides of said center tube and said balance rod means include a pair of rods axially slidably disposed within said balance tubes, with said balance rods being rigidly interconnected to said operating rod by means of a yoke and with said piston means consisting of a pair of pistons, each being secured to one of said balance rods.

6. Apparatus for servicing a valve having a body formed with a fluid passage, the rear end of said passage being open, a valve stem extending through the rear end of said passage and being formed at its rear end with an internally threaded blind bore, and sealing means removably disposed in the rear end of said passage, comprising: a valve stem-receiving member having means on its front portion for detachably affixing it to the rear end of said valve body, said member being formed with a conduit that is aligned with said fluid passage when said member is affixed to said valve body, said member also having a core formed with bore means normally arranged transversely to said conduit so as to block same, said core means being rotatable to a second position wherein said bore means are aligned with said conduit; a pressure tool having a center tube and balance tube means aligned with said center tube, the interiors of said center tube and said balance tube means being connected; mounting means on the front portion of said center tube engageable with the rear end of said valve stem-receiving member; an operating tube axially slidably disposed within said center tube formed at its front end with a cavity that non-rotatably receives the rear end of said valve stem; a mandrel axially slidably and rotatably disposed within said operating tube, the front end of said mandrel being threaded so as to be removably securable to the blind bore on the rear end of said valve stem; balance rod means axially slidably arranged within said balance tube means and provided with piston means, the rearwardly-facing areas of said piston means approximating the forwardly-facing areas of said operating tube; and means rigidly interconnecting said operating tube and said balance rod means for concurrent axial movement.

7. Apparatus as set forth in claim 6 wherein said balance tube means include a pair of tubes disposed on opposite sides of said center tube and said balance rod means include a pair of rods axially slidably disposed within said balance tubes, with said balance rods being rigidly interconnected to said operating tube by means of a yoke, and with said piston means consisting of a pair of pistons, each being secured to one of said balance rods.

8. Apparatus as set forth in claim 6 wherein the core of said valve stem receiving member is of hollow cylindrical configuration with one of its sides being formed with a slit that faces said valve body when said bore means are arranged transversely to said conduit.

References Cited in the file of this patent

UNITED STATES PATENTS

| | | |
|---|---|---|
| 1,181,910 | McGiluray | May 2, 1916 |
| 1,738,561 | Wattel | Nov. 19, 1929 |
| 1,895,827 | Van Hecke | Jan. 31, 1933 |
| 1,996,345 | Mueller | Apr. 2, 1935 |
| 2,077,507 | Yancy | Apr. 20, 1937 |
| 2,649,825 | Fisher | Aug. 25, 1953 |
| 2,744,310 | Gould | May 8, 1956 |
| 2,856,150 | McDonald | Oct. 14, 1958 |